May 8, 1945.  L. E. WATTEBOT  2,375,600
GAUGING APPARATUS
Filed March 1, 1943  2 Sheets-Sheet 1
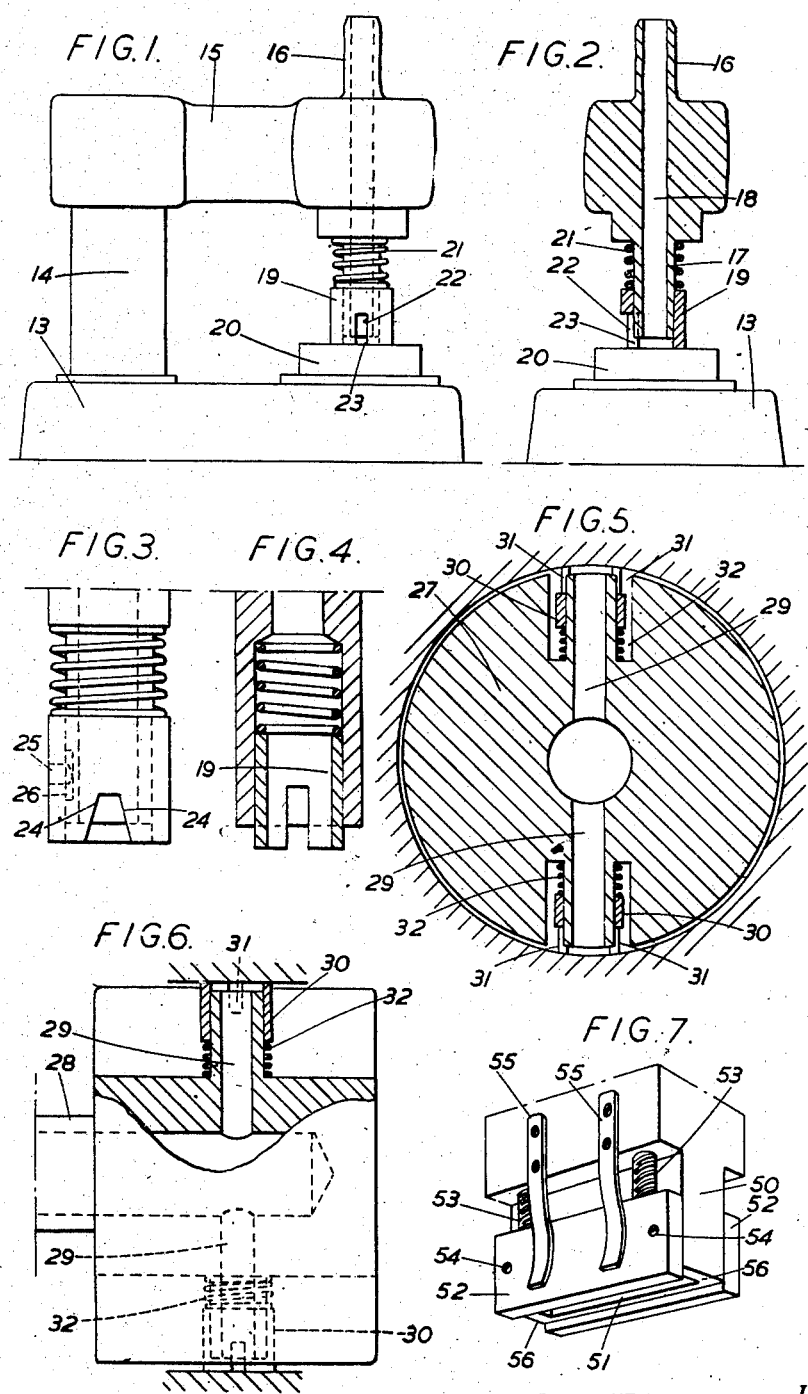
Louis Eugène Wattebot Inventor
By
Attorneys May 8, 1945.　　　　L. E. WATTEBOT　　　　2,375,600
GAUGING APPARATUS
Filed March 1, 1943　　　　2 Sheets-Sheet 2

Inventor
Louis Eugène Wattebot
By
Attorneys

Patented May 8, 1945

2,375,600

UNITED STATES PATENT OFFICE 2,375,600

GAUGING APPARATUS

Louis Eugene Wattebot, London N. W. 9, England, assignor to Solex Limited, London, England, a British company Application March 1, 1943, Serial No. 477,543
In Great Britain March 2, 1942

6 Claims. (Cl. 33—147)

This invention relates to gauging apparatus which includes at least one measuring nozzle (for for example two in parallel) for the outflow of liquid or gaseous fluid under pressure (more particularly air) operating in conjunction with the part or surface to be measured, the actual measurement, errors or the like being shown on indicating or recording means (manometer, flow meter or otherwise) and has for its object to provide such devices, and more especially the nozzle portions of such devices, which give greater efficiency and accuracy than hitherto to such apparatus.

In general, a measuring nozzle for gauging apparatus in accordance with the invention, in place of having its outlet orifice unimpeded so that the total perimeter is available for the passage of the fluid as hitherto, has screening means in movable association therewith adapted to be maintained in contact with the surface of the part being measured by spring or other means and of such position, shape and extent in relation to the actual outlet orifice that less than and preferably only a small proportion of the total perimeter of such orifice is available for the passage of the fluid.

The invention may be carried into effect in a great variety of manners, depending upon the particular purpose of the gauging apparatus. For example, it may be applied to such apparatus having a single measuring nozzle or to each of the nozzles of an apparatus operating with dual nozzles in parallel, or otherwise.

For example, the screening means may be applied to the exterior of the nozzle or to the interior thereof and in either case can partake of the nature of a sleeve with a slot or slots having parallel sides or sides divergent or convergent. Again, in place of the sleeve being open-ended it may be closed although the slot or slots extend to the end thereof. In certain cases the sleeve can be replaced by a plug having the necessary slot or slots, which latter in some cases may communicate with a bore in the interior of the plug.

The section of the nozzle can be as desired and although in most cases it is circular, it can be of oval, flattened or other cross section and the screen utilised in connection therewith may be correspondingly shaped. Still further, in some cases the screen may be comprised by a slide or slides and when more than one slide is utilised the said slides may be interconnected.

In certain cases, especially where the construction is of such a character that the sleeve, plug or the like has a closed end, the actual leakage gap may be removed from the contact surface to a desired extent, its variability depending upon the positions of relatively moving or sliding parts, as hereinafter explained.

In order that the invention may be better understood, it will now be described with reference to the accompanying drawings which are given by way of example only and in which—

Fig. 1 is a side elevation and Fig. 2 an end view partly in section, of one embodiment of the invention.

Fig. 3 is an enlarged fragmentary elevation of one form of nozzle structure proper, similar to the nozzle shown in Figs. 1 and 2.

Fig. 4 is a view similar to Fig. 3 (but in section) of another embodiment of the invention.

Fig. 5 shows a sectional elevation and Fig. 6 a side elevation partly in section of another embodiment of the invention.

Fig. 7 shows a perspective view to an enlarged scale of one form of nozzle of flattened section constructed according to the invention.

Figure 8:
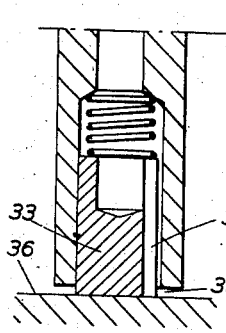
Figs. 8 and 9 show similar views to Fig. 4 of still further embodiments of the invention.

This indicating or recording means however forms no part of the present invention but actually does form part of the complete gauging apparatus necessary for use with the present invention; thus, in the description to follow it will be assumed that the fluid passing to the nozzle (particularly air and moreover air not highly compressed but at a desired pressure above atmospheric pressure) operates any such or any other equivalent indicating and/or recording device and will not further be dealt with.

Referring to the form of the invention shown in Figs. 1 and 2, 13 is a cast or other base having a standard 14 from which projects a horizontal arm 15. At its outer end this arm has a boss with an upper extension 16 and a downward extension 17, with a bore 18 passing through the upper extension 16 the boss and the downward extension 17. The said downward extension 17 constitutes the outlet nozzle proper and has mounted therearound in sliding engagement therewith a sleeve 19. The lower end of the sleeve is adapted to make contact with a workpiece 20 and is kept pressed thereto by a spring 21. 22 is a slot of slight angular extent and desired length in the sleeve 19.

In the apparatus it will be understood that the lower end of the nozzle proper comes a desired distance above the part to be measured and the lower end of the sleeve 19 makes close contact with the surface of the piece to be measured.

When using the device in accordance with Figs. 1 and 2, it will be realised that the pressure fluid (for example air) passing down the bore 18 can only escape through the part of the slot 22 which has been numbered 23 and which comes below the actual lower end of the nozzle proper. Thus it is emphasised that the measurement of the workpiece depends upon the height of this portion of the slot 22 which projects below the end of the nozzle proper.

In Fig. 1 the slot 22 is shown as having parallel sides. However, such slot may have convergent or divergent sides and in Fig. 3 the slot is shown with divergent sides 24. Again, in this figure is indicated stop means comprising a screw 25 in the sleeve 19 the inner end of which engages in a slot 26 in the downward extension 17. This limits the vertical movements of the sleeve 19 and also any circumferential movement but permits free sliding action.

It should here be stated that stop devices such as described will be utilised where necessary in all constructions in accordance with the invention, although not particularly described hereafter.

In place of, as shown in Figs. 1, 2 and 3, the screen formed by the sleeve 19 coming on the exterior of the nozzle proper, the sleeve may be arranged on the interior of the nozzle. Such a construction is shown in Fig. 4 where the sleeve 19' is shown actually on the interior of the nozzle.

Referring to Figs. 5 and 6, here a plug gauge is shown of the type to deal with internal diameters although with but slight modification such a gauge can be utilised for measuring widths, such for example as the widths of grooves, slots or otherwise.

However, in connection with the particular form shown in Figs. 5 and 6, 27 is the plug proper carried by a more or less central conduit 28 for the pressure fluid which opens into two radial conduits 29. The outer ends of these radial conduits constitute two nozzles proper and their cylindrical exteriors have sliding thereon sleeves 30, each sleeve having two gaps 31 arranged in diametrically opposite positions and being kept pressed outwardly by a spring 32.

It will be understood that the combined angular extent of the width of the slots in each sleeve forms a restricted outlet for the pressure fluid (preferably air) from its associated nozzle.

In Fig. 7 is shown a nozzle 50 of flattened section with an outlet 51 which is to come a desired distance above the part to be measured. The screening means in this case is formed by two slides 52 kept pressed outwardly by springs 53, although the sliding movement is limited by stops indicated at 54 and the screen is kept in place by other springs 55.

When in action it will be realised that the two longer sides of the nozzle 50 are screened whilst the two shorter sides of the nozzle have gaps 56 between themselves and the screens 52 for the escape of the pressure fluid, the variable height of which gaps gives the necessary indication.

Although the slides 52 have been shown separate, in some cases they may be joined and where desired only one end may have a gap such as 56.

In Fig. 8 there is shown a plug 33 on the interior of the nozzle, the said plug having a longitudinal slot 34 in one position thereof and being kept pressed outwardly by spring means. Thus the outlet 35 from the slot is variable in accordance with the workpiece 36, and this gives the measure to be indicated.

Figure 9:
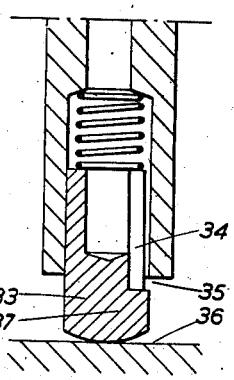

A similar device is shown in Fig. 9 but here in place of the plug proper 33 having throughout its length the slot 34, it has a solid part 37 contacting with the workpiece 36 in order to bring the measuring gap 35 into any desired position. It will be understood that the solid part of the plug can remove the said measuring gap to any desired position, in accordance with the actual length of the said solid part of the plug or the like.

Figure 10:
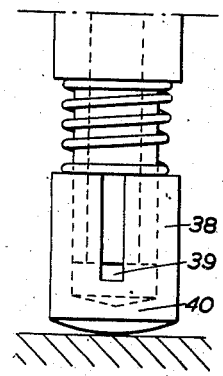
Fig. 10 shows a similar view to Fig. 3, of another embodiment.

Referring to Fig. 10, this is a similar view to Fig. 9 except that in place of a plug a sleeve 38 is employed to bring the leakage gap 39 to any desired position according to the thickness or length of the solid part 40 at the end of the said sleeve 38.

Figure 11:
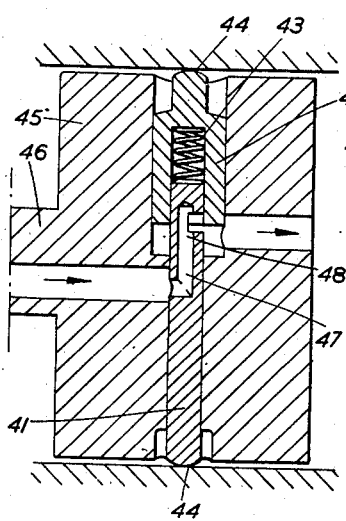
Fig. 11 shows a sectional side elevation and Fig. 12 an end elevation of Fig. 11 (partly in section) of still another embodiment.
Figure 12:
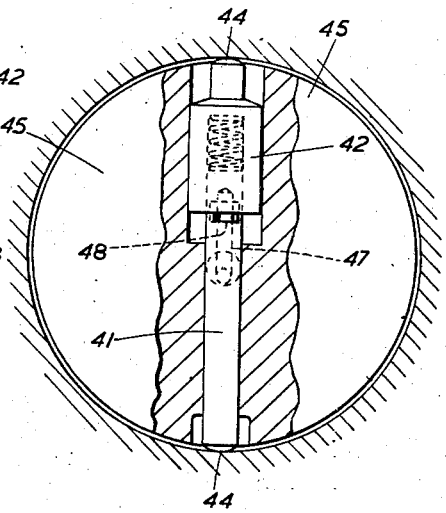

Figs. 11 and 12 show what may be regarded as an extension of the invention shown in Figs. 9 and 10, although particularly they refer to Fig. 9 but by modification can easily be adapted to Fig. 10. Thus, in Fig. 11 there is shown a plug 41 having a rounded end which enters a sleeve 42 and is kept pressed outwardly by a spring 43, both the plug 41 and sleeve 42 having contact measuring parts 44. The members 41 and 42 are carried by a main plug body 45 having fluid pressure supply 46.

In the particular case shown in the drawings, the plug 41 has a bore 47 communicating with a peripheral gap 48 of desired angular and longitudinal extent. This is variably covered by the inner end of the sleeve 42 and by the said variable covering gives a variable outlet. Thus the position of the parts, in so far as the distance between the contacting points 44 is concerned, determines the actual area of the portion of the gap 48 through which the pressure fluid escapes. In addition this, through the measuring devices (whatever they may be), gives the necessary reading.

Where necessary adequate means may be included in the structure of nozzles and gauges according to the invention for the exhaust or escape of the fluid (such as air) which has passed through the variable measuring gap or gaps.

For instance, in the forms shown in Figs. 1, 2, 3, 4, 7, 8, 9 and 10, no additional exhaust means normally is necessary although as will be seen in Figs. 5 and 6 the plug 27 has cylindrical and longitudinal cut away portions for the free exhaust of the fluid which has passed through the measuring gaps. Similarly, a free passage to the exterior is provided in the plug 45 in the form shown in Figs. 11 and 12 for the said fluid.

Again, whatever constructional form the invention may take, it is obvious the actual shape of the portion of the screen or screens which makes contact with the part being operated upon can be varied to suit the particular conformation of the part.

The invention is not limited to the precise forms or details of construction described, as these may be varied to suit particular requirements.

What I claim and desire to secure by Letters Patent of the United States of America is:

1. In a gauge of the character described, the combination of a support member provided with a rectilinear conduit for pressure fluid, a work contacting member having a cavity and being rectilinearly movable relatively to the support member, and a spring interposed between said members for normally biasing the contact member in predetermined direction relatively to the support member, the cavity of the work contacting member being in all positions of the member in communication with the conduit, and one of said members having a slit in communication with the cavity and extending in the direction of the relative movement of the work contacting member, said slit being partly obstructed at one end by the companion member, whereby upon placing the contacting member to operative position against the work, the flow of the pressure fluid through said conduit, cavity and unobstructed end portion of the slit varies with the spring controlled relation of said members.

2. In a gauge of the character described, the combination of a support member provided with a rectilinear conduit for pressure fluid, a work contacting member having a cavity and being rectilinearly movable relatively to the support member, and a spring interposed between said members for normally biasing the contact member in predetermined direction relatively to the cavity in said contacting member, the cavity of the work contacting member being in all positions of the member in communication with the conduit of the other member, and the work contacting member having a slit in communication with the cavity, said slit being partly obstructed at one end by the companion member, whereby upon placing the contacting member to operative position against the work, the flow of pressure fluid through said conduit, cavity and unobstructed end portion of the slit varies with the spring controlled relation of said members.

3. In a gauge of the character described, the combination of a support member provided with a rectilinear conduit for pressure fluid, a work contacting member having a cavity and being rectilinearly movable relatively to the support member, and a spring interposed between said members for normally biasing the work contacting member to a position in which the end of said contacting member projects beyond the end of the companion member, the cavity of the work contacting member being in all positions of said member in communication with the conduit, and one of the members having a slit in communication with the cavity and extending in the direction of the relative movement of the work contacting member, said slit being partly obstructed at that end at which the work contacting member projects beyond the companion member, whereby upon placing the contacting member to operative position against the work, the flow of the pressure fluid through said conduit, cavity and unobstructed end portion of the slit varies with the spring control relation of said members.

4. In a gauge of the character described, the combination of a support member provided with a rectilinear conduit for the pressure fluid, a nozzle extension on said support member and through which extension the rectilinear conduit is positioned, a work contacting member having a cavity and being rectilinearly movable relatively to the nozzle, and a spring interposed between said members for normally biasing the contact member in predetermined direction relatively to the nozzle, the cavity of the work contacting member being in all positions of the member in communication with the conduit portion extending through the nozzle, and one of said members having a slit in communication with the cavity and extending in the direction of the relative movement of the work contacting member, said slit being partly obstructed by the end of the nozzle, whereby upon placing the contacting member to operative position against the work, the flow of the pressure fluid through said supporting member, nozzle and unobstructed end portion of the slit varies with the spring controlled relation of said members.

5. In a gauge of the character described, the combination of a base on which the work to be gauged is to be positioned, a supporting member mounted in opposition to said base and spaced therefrom, the supporting member being provided with a conduit for pressure fluid, a work contacting member rectilinearly guided by a portion of the base, said work contacting member having a cavity in communication with the conduit, and a spring interposed between said members for normally biasing the conduit member on the supporting member in direction towards the base, one of the members having a slit in communication with the cavity and extending in the direction of the relative movement of the work contacting member, the slit being partly obstructed at one end by the companion member, whereby upon placing the contacting member to operative position against the work on the base, the flow of pressure fluid from the unobstructed end portion of the slit varies with the work controlled relation of said members.

6. In a gauge of the character described, the combination of a base on which the work to be gauged is adapted to be positioned, a support member provided with a rectilinear conduit for pressure fluid extending through said supporting member at right angle to the work carrying surfaces of the base, a work contacting member having a cavity and being guided on the companion member for movement in a direction parallel to the conduit, and a spring interposed between the members for normally biasing the contact member to work engaging position relatively to the support member, the cavity of the work contacting member being in all positions in communication with the conduit of the supporting member, and said work contacting member having a slit in communication with the cavity and extending in the direction of the spring controlled movement of the work contacting member relatively to the supporting member, said slit being partly obstructed at one end by the supporting member, whereby upon placing the contacting member against the tension of the spring to operative position against the work, the flow of the pressure fluid through said conduit cavity and unobstructed end portion of the slit varies with the relation of said members as determined by the work to be gauged.

LOUIS EUGENE WATTEBOT.